Figure 1:
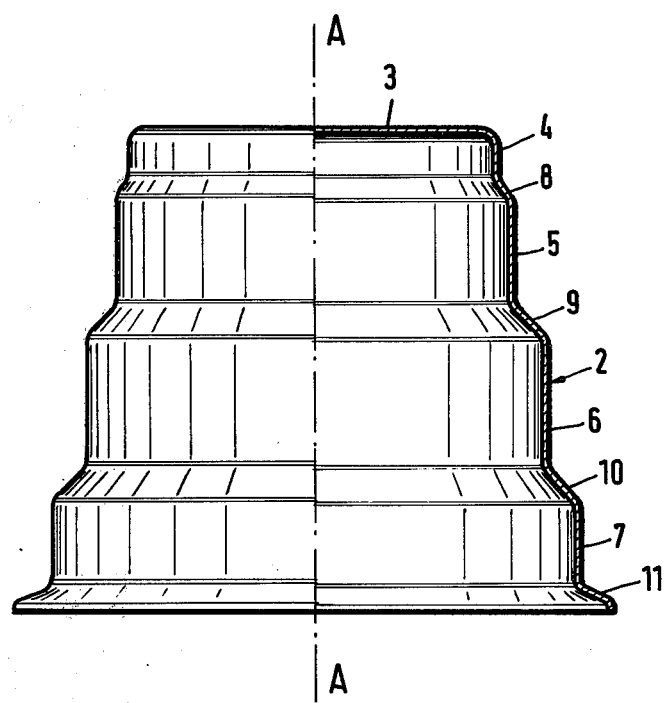

United States Patent [19]

Schroth

[11] 4,173,136
[45] Nov. 6, 1979

[54] METHOD AND APPARATUS FOR PRODUCING MULTIPLE GROOVE V-BELT PULLEYS

[76] Inventor: Wilhelm H. Schroth, Ringstrasse 12, D-6053 Obertshausen, Fed. Rep. of Germany

[21] Appl. No.: 852,563

[22] Filed: Nov. 17, 1977

[51] Int. Cl.² .............................................. B21D 26/04
[52] U.S. Cl. .............................................. 72/58; 72/62; 72/59; 29/159 R
[58] Field of Search ...................................... 72/58–62; 29/159 R, 421 R

[56] References Cited

U.S. PATENT DOCUMENTS

| | | | |
|---|---|---|---|
| 2,929,345 | 3/1960 | Zatyko | 72/58 X |
| 3,630,056 | 12/1971 | Cuq | 72/58 |
| 3,675,453 | 7/1972 | Marsch | 72/61 |
| 3,820,369 | 6/1974 | Tominaga et al. | 72/58 |
| 3,851,366 | 12/1974 | Jacobs | 29/159 R |
| 3,935,627 | 2/1976 | Wolbert | 29/159 R |

FOREIGN PATENT DOCUMENTS 466168 12/1951 Italy ........................................ 29/159 R Primary Examiner—Leon Gilden
Attorney, Agent, or Firm—Frederick K. Lacher

[57] ABSTRACT

A multiple groove pulley is formed from a cup-shaped blank by an apparatus and method in which axially displaceable segmental shaping rings are positioned at axially predetermined positions along the wall of the blank. Fluid pressure communicated to the interior of the blank expands the wall of the blank into contact with the shaping rings and at least one of the shaping rings is independently movable in an axial direction while the blank is compressed for simultaneous formation of the grooves. A sleeve member is movable axially over at least one of the shaping rings to resist radial movement of the segments while at the same time permitting full compression of the blank.

19 Claims, 6 Drawing Figures

IV-IV

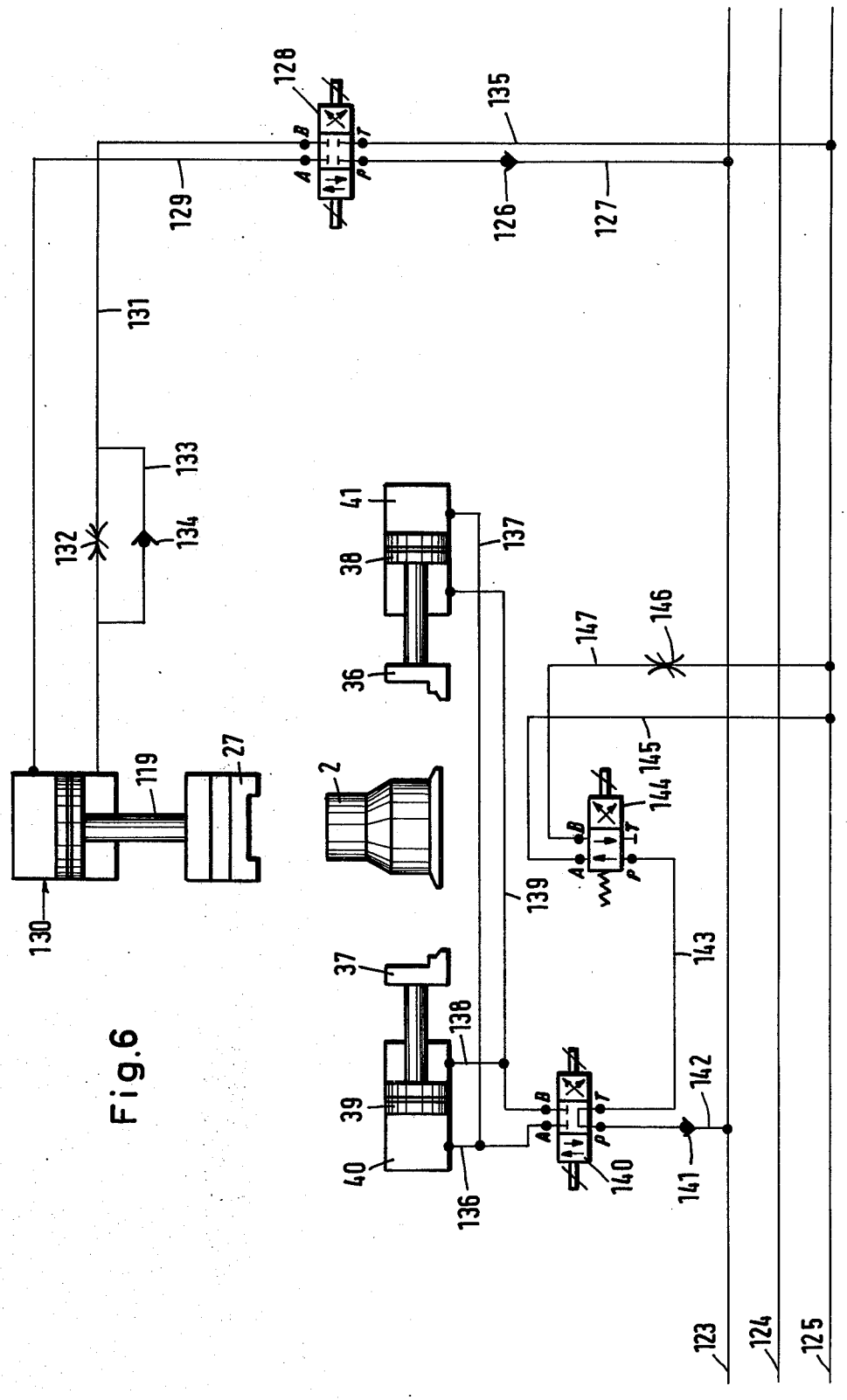

METHOD AND APPARATUS FOR PRODUCING MULTIPLE GROOVE V-BELT PULLEYS

The invention relates to a method and to an apparatus for producing multiple groove V-belt pulleys from sheet metal by cold-working a prefabricated cup-shaped blank under an internal hydraulic pressure by means of axially displaceable shaping parts which embrace the blank.

Various methods and apparatuses are known for the manufacture of single groove V-belt pulleys. It is also possible to produce two-groove V-belt pulleys from one piece, for example, by means of shaping rollers which are pressed from the outside against a rotary, cup-shaped blank. Furthermore, a method for producing two-groove V-belt pulleys is known which operates with hydraulic pressure inside the blank and employs rubber members which wear during the working process. A satisfactory method for producing sheet metal V-belt pulleys made by cold-working with more than two grooves is not known, so that hitherto it has been necessary to assemble or weld together such V-belt pulleys from a plurality of individual discs or process the pulleys further. These V-belt pulleys are very susceptible to corrosion and, due to the number of operations, also expensive to manufacture.

The primary object of the invention is to provide a method and an apparatus for producing one-piece V-belt pulleys from sheet metal with multiple grooves. The apparatus necessary for this purpose must also be simply constructed and easy to operate.

According to the invention this object is fulfilled in that firstly the spaced shaping parts are moved radially up to the blank to form shaping rings, a sleeve-shaped member is forced over the shaping parts by the press ram, fluid pressure is produced within the cup-shaped blank as a result of which it is pressed firmly against the shaping parts along peripheral lines and only one shaping member is axially displaced by means of the press ram, while the other axially displaceable shaping rings are displaced in independently movable manner from their initial position at the start of the operation into their final position at the end of the operation.

With the exception of the generally uppermost shaping member, the shaping parts which also produce grooves or peripheral slots move continuously towards the end position during the production process without being subject to the axial pressure of part of the press ram or any other component, while simultaneously the sheet metal of the cup-shaped blank is located between the wedge-shaped areas of the shaping parts in cross section and thereby assumes the configuration of the desired V-belt pulley. In this connection it is particularly advantageous that the production of the various grooves of the V-belt pulley does not take place in individual successive stages, but instead simultaneously in one continuous operation.

The apparatus according to the invention for producing the V-belt pulleys according to the method of the invention has semicircular shaping parts which are displaced radially from the outside against the blank, whereby in each case the lowermost shaping part carries the other shaping parts in axially independently displaceable manner. Furthermore, according to the invention, a sleeve-like member is connected in axially displaceable manner with press ram. The sleeve-like member grips in form-locked manner over at least the outermost shaping parts and during the actual working process reliably and immovably holds together the shaping parts.

Further features of the invention can be gathered from the description and drawings. The invention is described in greater detail hereinafter relative to an embodiment illustrated in the drawings, which show:

FIG. 1, a partial sectional view of a prefabricated cup-shaped blank.

Figure 2:
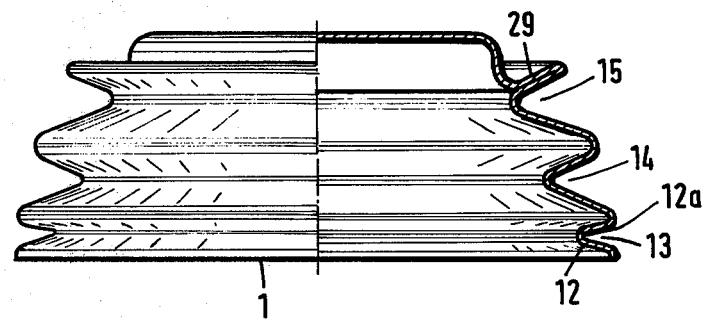

FIG. 2, a partial sectional view of a three-groove V-belt pulley.

Figure 3:
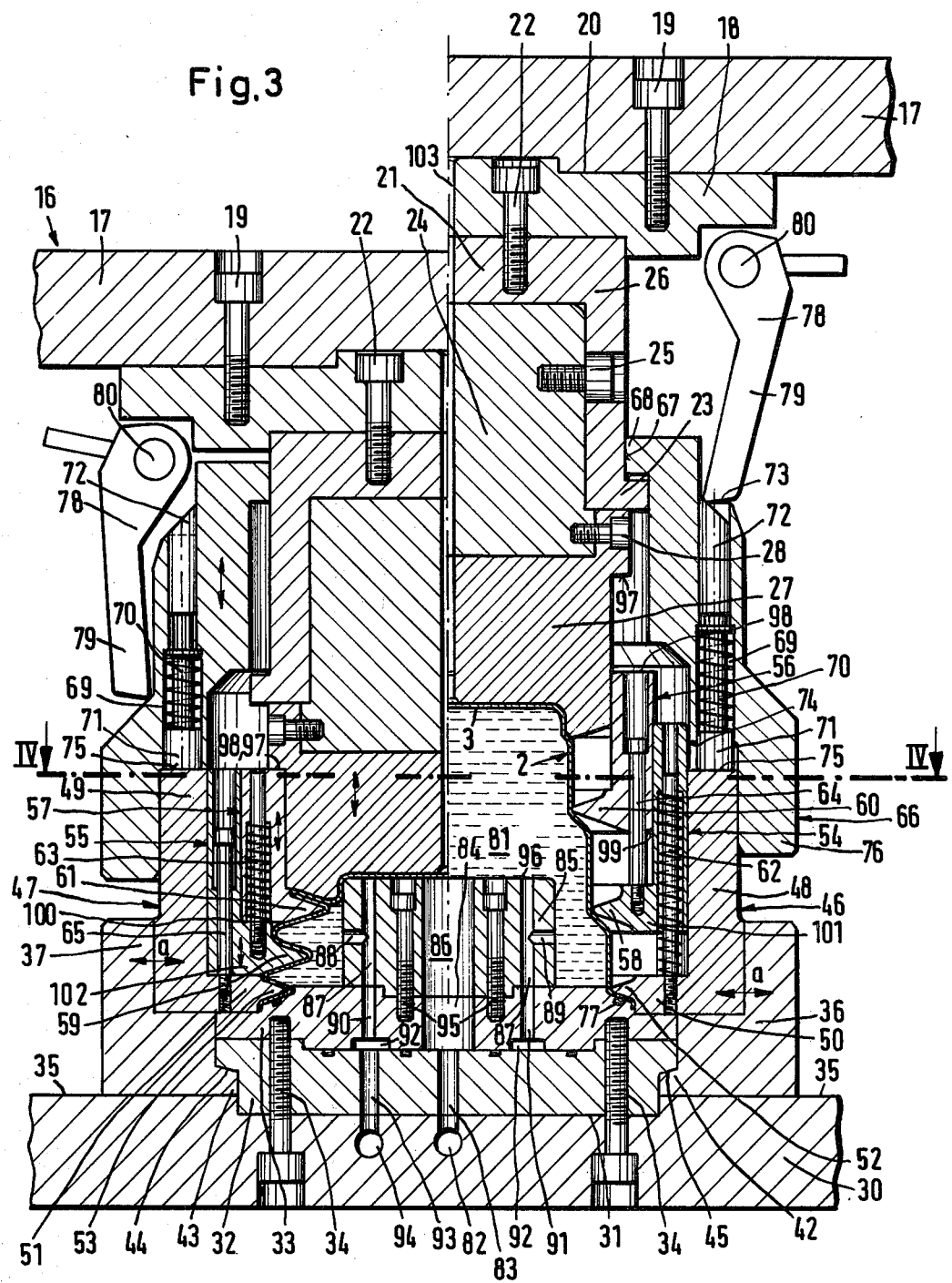

FIG. 3., a section through the apparatus for producing the V-belt pulley according to FIG. 2 on a smaller scale in two working positions on the right-hand and left-hand sides of the drawing.

Figure 4:
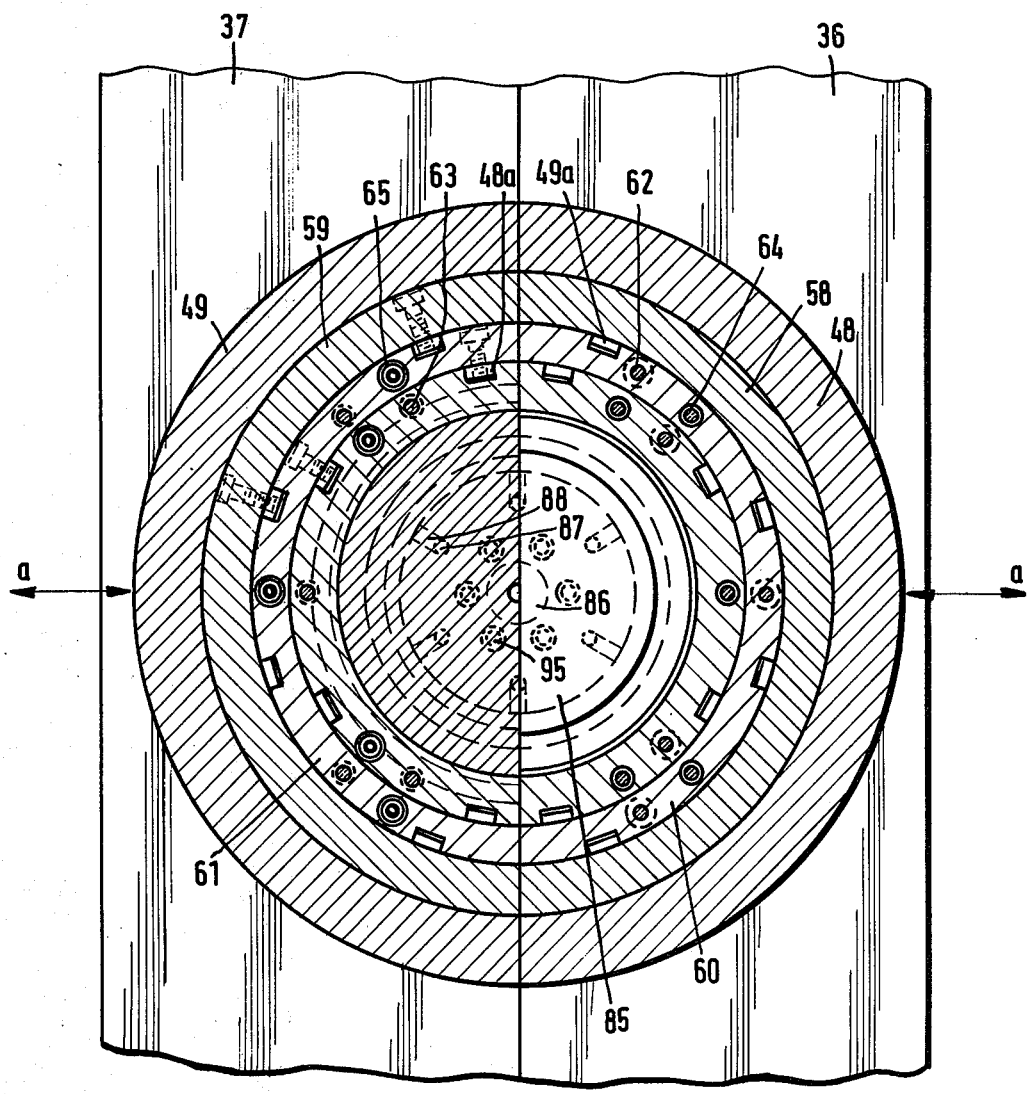

FIG. 4, an enlarged sectional view taken along the plane of line IV—IV in FIG. 1.

Figure 5:
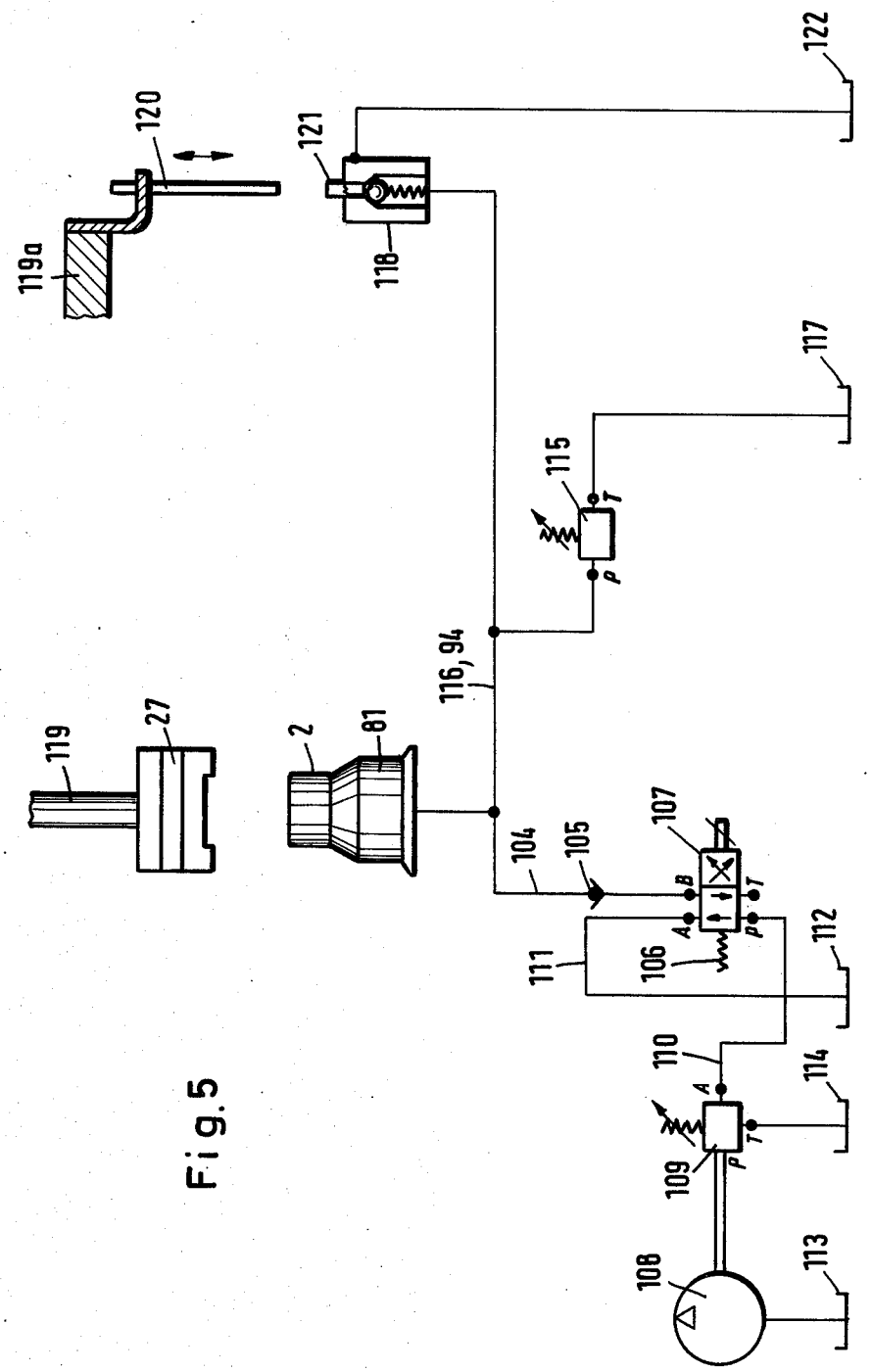

FIG. 5, a diagrammatic representation of the device which produces the hydraulic pressure in the blank.

FIG. 6, a diagrammatic representation of the hydraulic device which controls the press ram and the radially directed movement of the shaping parts.

A blank 2 according to FIG. 1 produced in per se known manner by deep drawing a sheet metal part is used for producing, for example, a three-groove V-belt pulley 1 according to FIG. 2. Blank 2 is a cup-shaped member with a base 3 to which is connected a cylindrical part 4 having an axis A—A. Further coaxial cylindrical parts 5, 6 and 7 are provided in spaced manner from cylindrical part 4 and between each of these parts is located conical areas 8, 9 and 10. Cylindrical part 7 is followed by a further conical peripheral part 11 which, in the finished V-belt pulley 1, forms the outer boundary wall 12 of one outer keyway or groove 13.

The other boundary wall 12a and the two other grooves 14, 15 are produced according to the method of the invention in apparatus 16 shown in FIG. 3.

From top to bottom apparatus 16 comprises a cover plate 17 to which is fixed a supporting or centering plate 18 by means of symbolically indicated screws 19. Centering plate 18 has a recess 20 in which is held a cup-shaped bearing member 21 by means of screws 22. The flange-like edge 23 of bearing member 21 projects over its, for example, cylindrical periphery.

Within the cup-shaped bearing member 21 is provided a supporting part or spacer 24 which is fixed in the wall 26 of bearing member 21 by means of screws 25.

To supporting part of spacer 24 is fixed an upper shaping member 27 by screws 28 and during the production process it engages base 3 of blank 2 and participates in the shaping of the outer boundary wall 29 of groove 15.

From bottom to top the apparatus comprises a base plate 30 with a recess 31 in which is located an intermediate plate 32 which carries a lower shaping member 33 which, like intermediate plate 32, is fixed to base plate 30 by means of screws 34.

Immediately on the surface 35 of base plate 30 are arranged two supports 36, 37 which are movable horizontally in the direction of arrow A or are movable towards and away from intermediate plate 32 and lower shaping member 33. For this purpose, hydraulic devices such as pistons 38, 39 and cylinders 40, 41, are provided as shown in FIG. 6.

Supports 36, 37 may be segmental and in this embodiment are semicircular and together form a ring. On the inner circumference thereof is provided a shoulder 42 or 43 with an inclined surface 44 or 45 which in the retracted state engages in form-locked manner a corresponding inclined surface of intermediate plate 32.

Shaping parts 46, 47 which essentially have the shape of cylindrical half-shells 48, 49 are fixed in an appropriate manner to supports 36, 37. An annular flange 50, 51 is positioned at the lower end thereof in each case, whereby the radially inner edge area 52, 53 of the flange 50, 51 has the wedge shape necessary for producing groove 13.

Shaping parts 46, 47 serve as supports for further shaping parts 54, 55 and the latter in turn serve as supports for inner shaping parts 56, 57. Shaping parts 54 to 57 are essentially shaped in the same way as shaping parts 46, 47 and comprise cylindrical half-shells with an annular flange at one end and in each case a wedge-shaped edge area in cross section 58, 59 of one shaping ring or 60, 61 of another shaping ring for producing the grooves 14, 15 of V-belt pulley 1.

Shaping parts 54 to 57 are guided in an independently movable manner in the axial direction in shaping parts 46, 47 for which purpose the surfaces of their cylindrical half-shells are used. As can be gathered from FIG. 3, shaping parts 54 and 55 are inserted into shaping parts 46, 47 and shaping parts 56, 57 are positioned radially inward in shaping parts 54, 55. To prevent the shaping parts from dropping out, a plurality of guide keys 48a, 49a shown in FIG. 4 are provided between the different shaping parts. These guide keys 48a, 49a are positioned axially and in each case are fixed by screws to the inner surfaces of the adjacent shaping parts 48, 49, 58, 59 for engagement in grooves at the outer surfaces of the adjacent shaping parts 58, 59, 60, 61.

Furthermore a plurality of springs 62 are provided which axially force shaping parts 54, 55 away from shaping parts 46, 47. The same applies regarding springs 63 which act between shaping parts 54, 55 and shaping parts 56, 57. The displacement of shaping parts 54, 55 relative to shaping parts 46, 47 or shaping parts 56, 57 relative to shaping parts 54, 55 brought about by springs 62, 63 is limited by a plurality of spacing bolts 64, 65 which precisely fix the position of all the shaping parts in the initial position prior to the commencement of operations as shown in the right-hand half of FIG. 3. Springs 62, 63 force the shaping parts apart until they have reached the position defined by spacing bolts 64, 65. Spacing bolts 64, 65 which are provided in an adequate number over the entire circumference of shaping parts 54 to 57 also serve to accurately adjust the shaping parts so that the wedge-shaped marginal areas 58 to 61 assume the precisely predetermined position at the start of the operation.

Finally, FIG. 3 shows a sleeve-like retaining member such as bell-shaped member 66 whose top has a bore 67 surrounding and engaging the cylindrical wall 26 of the cup-shaped bearing member 21. Bell-shaped member 66 is slidably mounted on the outer surface of wall 26 and is held by bearing member 21 with the aid of flange-like edge 23 which engages a corresponding flange-like edge 68 on the top of bell-shaped member 66.

Around its periphery bell-shaped member 66 has a plurality of bores 69 in which are arranged plungers 71 subject to the action of springs 70 and having free, wedge-shaped ends 72. The wedge-shaped ends 72 of plungers 71 project out of bores 69 at a radial shoulder 73 of bell-shaped member 66 when the plungers 71 and a shoulder 74 within bell-shaped member 66 engage the face 75 of the outer shaping parts 46, 47. By means of a cylindrical portion 76, bell-shaped member 66 embraces the outer shaping parts 46, 47 so that during the actual operation they cannot move radially outward in the direction of arrow A.

Prior to the start of the first operation the cover plate 17 fixed to a press ram and all the components connected therewith including the upper shaping member 27 and the bell-shaped member 66 are located in such a raised position that the supports 36, 37 and with the latter all the shaping parts 46, 47, 54, 56, 57 can be moved outwardly in a free and unimpeded manner in the direction of arrow A. The space between all the shaping parts is accessible, so that a blank 2 can be placed manually on the lower shaping member 33 which has an annular seal 77. Supports 36, 37 with their shaping parts are then moved together and the cover plate 17 is lowered by the press ram whereby the cylindrical part slides over the outer shaping parts 46, 47, as shown in the right-hand half of FIG. 3. By means of rocking levers 78 bell-shaped member 66 is pressed over shaping parts 46, 47 which rest on the radially directed shoulder 73 of bell-shaped member 66. When the plungers 71 in bell-shaped member 66 strike against the faces 75 of shaping parts 46, 47, the wedge-shaped ends 72 of plungers 71 pivot the rocking levers 78 radially outwards so that bell-shaped member 66 remains in the position shown in the left-hand half of FIG. 3 even in the case of further lowering of cover plate 17 and the members connected therewith such as, for example, rocking levers 78 located on shafts 80. During the further lowering movement the free ends 79 of the rocking levers 78 run along the outer contour of bell-shaped member 66 and by means (not shown) springs are loaded in the direction of bell-shaped members 66 so that they can be pivoted back into their initial position after raising cover plate 17.

As soon as the cover plate 17 is lowered and the upper shaping member 27 is located on the base 3 of blank 2 the interior 81 of the blank is filled with a fluid. This takes place through a bore 82 in base plate 30 which is connected with a bore 83 in intermediate plate 32 and a bore 84 in the lower shaping member 33. The lower shaping member 33 also carries a spacer 85 which also has a bore 86 which links bore 84 with the interior 81 of blank 2.

Finally, the spacer 85 has a plurality of bores 87, 88, 89 which are directed axially parallel and at right angles to the spacer surface and connect the interior 81 of blank 2 via bores 90, 91 as well as an annular bore 92 in the bottom of the lower shaping member 33 with a bore 93 in the intermediate plate 32 and a bore 94 in the base plate 30. The latter bore serve to remove the fluid from the interior 81 of the blank when the latter has been shaped.

Spacer 85, is, as shown in FIG. 3, fixed by means of screws 95 to the lower shaping member 33 and serves to both introduce and remove the hydraulic fluid, and with its upper face 96 serves as a stop member at the end of the production process.

When at the start of the production process supports 36, 37 with their shaping parts are moved up to the inserted blank 2, these shaping parts are in a precisely predetermined working position due to springs 62, 63 and spacing bolts 64, 65. If after lowering the bell-shaped member 66 the interior 81 of blank 2 is filled with hydraulic fluid, the blank firmly engages the wedge-shaped areas of the shaping parts. If the upper shaping member 27 is moved via the part connecting it with the cover plate 17 towards the lower shaping member 33, then the material of the blank is deflected into the spaces located between the wedge-shaped marginal areas of the spaced shaping rings. As the independently movable shaping rings with parts 54, 55 and 56, 57 and their wedge-shaped marginal areas 58, 59 and 60, 61 are fixed in linear manner on the blank periphery due to the high pressure in the interior of said blank on lowering the upper shaping member 27, they also continuously move in the direction of shaping member 33 and shaping parts 46, 47 without any other part moving said shaping parts 54, 55 and 56, 57. Only on reaching the terminal position according to the left-hand half of FIG. 3 is the upper shaping member 27 with its annular shoulder 97 placed on the free face 98 of inner shaping parts 56, 57 and consequently presses all the shaping parts against the lower shaping member 33 or the supports 36, 37. The resulting axially directed forces are transmitted by the lower faces 99, 100 of spring parts 56, 57 to the annular flanges 101, 102 of shaping parts 54, 55 and from there to the annular flanges 50, 51 whereby the V-belt pulley 1 assumes its final shape.

If at the end of the operation cover plate 17 is raised, the upper shaping member 27 slides out of the two shaping parts 56, 57 without initially changing its position as shown in the left-hand half of FIG. 3. If bell-shaped member 66 is also removed from the outer shaping parts 46, 47, supports 36, 37 with their shaping parts can move outwardly in the direction of arrow A. The finished V-belt pulley 1 can then be raised from spacer 85 or the lower shaping part 33 and the apparatus is ready for inserting the next blank 2.

Bore 103 in upper shaping member 27 and the parts located above it is used for ventilating the space located above blank 2 on lowering the upper shaping member.

FIG. 5 diagrammatically shows the hydraulic equipment necessary for filling and emptying the interior 81 of blank 2. Interior 81 is filled via a line 104 in which are provided a non-return valve 105 and a valve 107 which is subject to the action of a spring 106 and is controlled by means of an electromagnet. As required, valve 107 connects the line 110 coming from a pump 108 and a pressure regulating valve 109 via a line 111 with a tank 112 or line 104. Pump 108 removes the fluid from a tank 113 and pressure regulating valve 109 is also connected by means of its outlet T with a tank 114.

In the represented circuit of valve 107, the fluid from pump 108 flows through line 110 to inlet P of valve 107 and from there to outlet A and through line 111 to tank 112 which responds to the inoperative position. If valve 107 is switched over, fluid flows from inlet P to outlet B and through the non-return valve 105 in line 104 to the interior 81 of blank 2.

If during lowering the press ram or the upper shaping member 27 pressure of the fluid in the interior 81 of blank 2 is increased through the working of the latter, non-return valve 105 closes and pump 108 delivers fluid to tank 114 via pressure regulating valve 109.

There must be a specific pressure in interior 81 of blank 2 during the production process. This pressure is maintained constant by means of a pressure regulating valve 115 which is connected with the interior 81 of blank 2 by means of a line 116. If the pressure of the fluid in blank 2 exceeds a particular value, outlet T of pressure regulating valve 115 opens and fluid can escape into a tank 117 so that the fluid pressure is maintained constant.

A further valve 118 is connected to the line 116 and serves for the complete opening of said line when the press ram carrying cover plate 17 has reached its lowermost operating position. On the diagrammatically indicated press, ram 119 is provided with a contactor 120 which opens valve 118, shown as a ball-valve, through displacement of its stem 121.

As soon as valve 118 opens, the pressure in interior 81 of blank 2 drops to zero and all the fluid escapes into tank 122 connected to valve 118.

The control of press ram 119 and arm 119a which is connected therewith takes place independently of the filling and emptying of interior 81 of blank 2 in per se known manner and is not therefore shown in detail in FIG. 5.

Finally, FIG. 6 shows the hydraulic equipment which serves to move the supports for the radially and axially displaceable shaping parts.

FIG. 6 also shows the hydraulic components which move the press ram 119 and arm 119a connected with the latter.

The hydraulic equipment shown in FIG. 6 comprises a high pressure line 124, a low pressure line 123 and a line 125 leading to a tank. A line 127 which has a non-return valve 126 leads from high pressure line 124 to a magnetically controlled control valve 128 and from the outlet A thereof a line 129 leads to the top end of cylinder 130 of a press having a ram 119 fixed to the upper shaping member 27. Between the other end of cylinder 130 and the inlet B of control valve 128 is provided a line 131 which has a throttle valve 132 together with a non-return valve 134 in a line which bypasses the throttle valve 132. Finally a line 135 leads to tank line 125 from the outlet T of control valve 128.

Corresponding to the position of control valve 128, the fluid flows from inlet P either to outlet A or to outlet B and the fluid flowing back from cylinder 130 is guided to outlet T. Depending on the direction of flow, positions A and B constitute the inlet or outlet of the control valve.

The two cylinders 40, 41 of the hydraulic equipment which move the two supports 36, 37 with their shaping parts radially towards or away from the blank are connected at the top via lines 136, 137 with inlet/outlet A and via lines 138, 139 with inlet/outlet B of an electromagnetic control valve 140. A line 142 having a non-return valve 141 and leading to low pressure line 123 is connected to the inlet P of control valve 140.

Finally, a line 143 is provided which, accompanied by the interpositioning of a control valve 144, connects the outlet or tank connection T of control valve 140 either directly via a line 145 or with the interpositioning of a throttle valve 146 in a line 147 with tank line 125. Depending on the position of control valve 144, fluid flows from control valve 140 to tank line 125 either rapidly through line 145 or slowly through line 147 so that supports 36, 37 can be moved at two different speeds.

The electrical control system of the various control valves 128, 140 and 144 is not shown because it is known to the expert.

Changes and further modifications are possible to the invention without passing beyond the scope thereof. Thus, it is, for example, possible according to the invention after adding further shaping parts to produce multiple groove V-belt pulleys with more than three grooves, i.e. with four or five grooves. In addition, the apparatus according to the invention is not limited to the production of V-belt pulleys with particular diameters because the different grooves in random positions can have any desired diameter.

I claim:

1. A method for producing a multiple groove V-belt pulley from sheet metal during a shaping operation to orm the multiple groove V-belt pulley by cold-working a prefabricated cup-shaped blank having at least one cylindrical portion and axially displaceable segmental shaping parts which form shaping rings to embrace said blank comprising moving said shaping parts radially up to the blank at axially spaced precisely predetermined positions to form and shaping rings, moving a sleeve-like retaining member over the shaping parts of a first one of said shaping rings so that the shaping parts cannot move radially outward during the shaping operation, producing controlled fluid pressure within the cup-shaped blank to engage the walls of the cup-shaped blank firmly against the shaping parts along spaced peripheral lines, axially compressing said cup-shaped blank while the other of said shaping rings are independently movable in an axial direction from an initial position at the start of the operation to a final position at the end of the operation without being subject to axial pressure from any other part moving said other shaping rings together to simultaneously form the grooves in the pulley, moving said sleeve-like retaining member from around the shaping parts of said first one of said shaping rings and moving said shaping parts radially outward away from the shaped pulley.

2. The method according to claim 1 wherein said sleeve-like retaining member is moved over said first one of said shaping rings by an upper tool means and said cup-shaped blank is axially compressed by said upper tool means.

3. The method according to claim 1 wherein said fluid pressure is hydraulic pressure provided by a pump means.

4. The method according to claim 1 wherein said segmental shaping parts are cylindrical half-shells and are moved radially into cylindrical configurations to form said shaping rings.

5. Apparatus for producing a multiple groove V-belt pulley from sheet metal by cold-working a prefabricated cup-shaped blank having at least one cylindrical portion during a shaping operation to form the multiple groove V-belt pulley comprising a plurality of axially displaceable segmental shaping parts (54, 55, 56, 57) forming shaping rings which embrace said blank, at least two segmental shaping parts (46, 47) being radially movable to form a first shaping ring, other of said shaping parts (54 to 57) being radially movable up to said blank to form other shaping rings along spaced peripheral lines, said first shaping ring carrying said other shaping rings in axially independently displaceable manner, said other shaping rings being arranged on said apparatus in such a manner and located in such positions where they will not be subject to axial pressure from any other components of the apparatus moving said other shaping rings together during the shaping operation, means for moving said shaping parts radially inward into engagement with said cup-shaped blank and radially outward away from said shaped pulley, a sleeve-like retaining member (66) arranged in axially displaceable manner over said segmental shaping parts (46, 47) (48, 49) of said first shaping rings, means for producing controlled fluid pressure in said cup-shaped blank to press the walls against said shaping parts along said spaced peripheral lines, means for controlling the fluid pressure during the shaping operation and means for axially compressing said cup-shaped blank so that the walls expand against said shaping parts and simultaneously form the grooves in the pulley.

6. Apparatus according to claim 5 wherein said means for axially compressing said cup-shaped blank (2) includes means for moving said sleeve-like retaining member (66) axially over said segmental shaping parts (46, 47) of said first shaping ring.

7. Apparatus according to claim 5 wherein said means for compressing said cup-shaped blank (2) includes a press ram (119) with an upper shaping member (27) operatively engageable with said cup-shaped blank (2).

8. Apparatus according to claim 5 wherein said shaping parts (46, 47) of said first shaping ring are positioned radially outward of said shaping parts (54 to 57) of said other shaping rings.

9. Apparatus according to claim 5 wherein said segmental shaping parts (46, 47, 54, 55, 56, 57) are cylindrical half-shells movable radially into engagement to form cylindrical configurations.

10. Apparatus according to claim 5 wherein said means for producing fluid pressure includes a hydraulic pump (108) in communication with the chamber in said cup-shaped blank (2).

11. Apparatus according to claim 5 wherein the top part of the sleeve-like retaining member (66) has a bore (67) and a flange-like edge (68) which bounds the latter, a cylindrical bearing member (21) extending through the bore (67) of the sleeve-like retaining member (66) and having a flange-like edge (23) engageable with said flange-like edge (68) of said sleeve-like retaining member (66).

12. Apparatus according to claim 6 wherein said means for moving said sleeve-like retaining member (66) includes rocking levers (78) pivotally supported above said sleeve-like retaining member and in engagement with a shoulder (73) of said sleeve-like retaining member, a plurality of bores (69) in the periphery of said sleeve-like retaining member (66) in which are arranged plungers (71) which are subject to the action of springs (70) urging said plungers towards said shaping members (46, 47) and when the sleeve-like retaining member (66) engages with a face (75) of the shaping parts (46, 47) of said first shaping ring, plungers (71) are moved upwardly to laterally deflect said plurality of rocking levers (78) out of engagement with said sleeve-like retaining member and thereby discontinue movement of the sleeve-like retaining member (66) axially over the shaping parts.

13. Apparatus according to claim 12 wherein the upper tool means includes a bearing and guiding member (21) which carries a shaping member (27) engageable with said cup-shaped blank (2) and is axially further displaceable within the sleeve-like retaining member (66) after deflection of said rocking levers (78).

14. Apparatus according to claim 11 wherein shaping parts (46, 47, 54, 55, 56, 57) are arranged on supports (36, 37) displaceable radially relative to blank (2) in the form of half-shells and the inner edge of each of the supports (36, 37) has a shoulder (42 or 43) with an inclined surface (44 or 45) which engages in form-locked manner on a corresponding inclined surface of an intermediate plate (32) carrying a lower stationary shaping member (33) when the apparatus is closed.

15. Apparatus according to claim 11 wherein said lower stationary shaping part (33) has a spacer (85) extending upwardly for motion-stopping engagement by the base (3) of blank (2) at the end of the production process.

16. The method according to claim 1 wherein said shaping parts are adjustable relative to one another in the axial direction.

17. The method according to claim 1 wherein the shaping parts are mounted on supports (36, 37) which are moved into gripping relationship under a fixed intermediate member (33) in form-locked manner upon moving of said shaping parts radially up to the blank.

18. Apparatus according to claim 5 wherein said means for axially compressing said cup-shaped blank includes a movable upper shaping member (27) and a fixed lower shaping member (33) so that during the shaping operation only one shaping member (27) is axially displaced by means of the press ram, while said other axially displaceable shaping rings are displaced in independently movable manner without being subject to axial pressure from any other components of the apparatus moving the shaping rings together.

19. Apparatus according to claim 5 wherein a plurality of spacing bolts (64, 65) are arranged in the shaping parts in order to precisely fix the position of all the shaping parts in the initial position prior to the commencement of the shaping operation.

* * * * *

UNITED STATES PATENT OFFICE
CERTIFICATE OF CORRECTION

Patent No. 4,173,136          Dated November 6, 1979

Inventor(s) Wilhelm H. Schroth

It is certified that error appears in the above-identified patent and that said Letters Patent are hereby corrected as shown below:

Column 2, line 49, change "of" to --or--.

Column 4, line 52, change "bore" to --bores--.

Column 5, line 19, change "spring" to --shaping--.

Column 7, line 12, before "shaping" change "and" to --said--.

Column 7, line 65, change "rings" to --ring--.

Column 8, line 3, after "walls" insert --will--.

Signed and Sealed this

Eighteenth Day of March 1980

[SEAL]

Attest:

SIDNEY A. DIAMOND

Attesting Officer      Commissioner of Patents and Trademarks